Nov. 16, 1943.      R. H. POTTERS      2,334,578
METHOD OF AND APPARATUS FOR PRODUCING GLASS BEADS
Filed Sept. 19, 1941      2 Sheets-Sheet 2
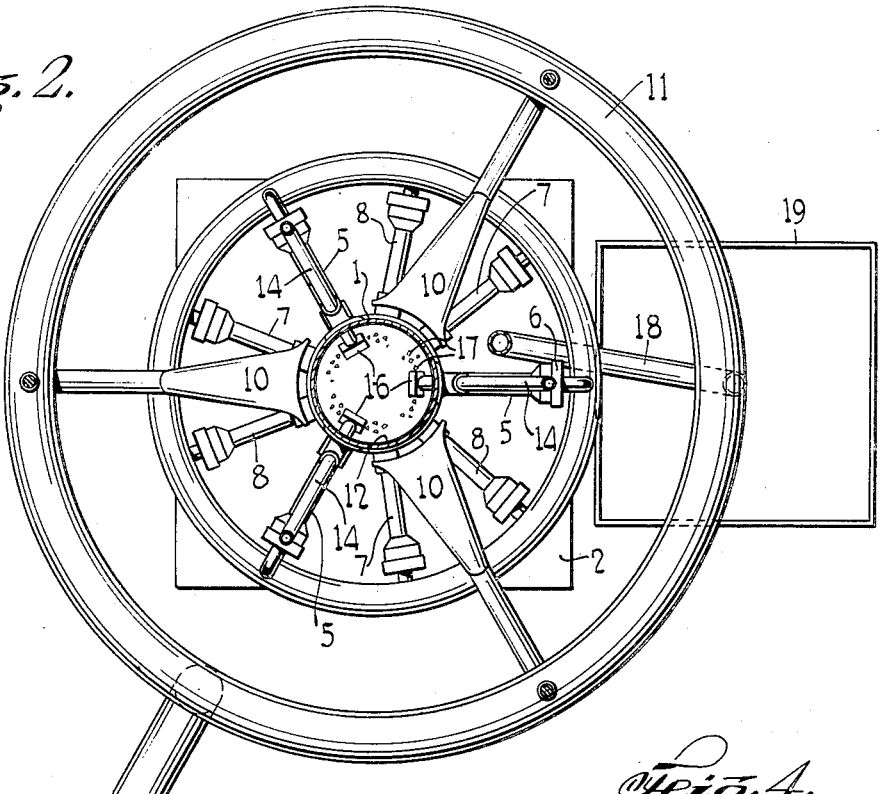
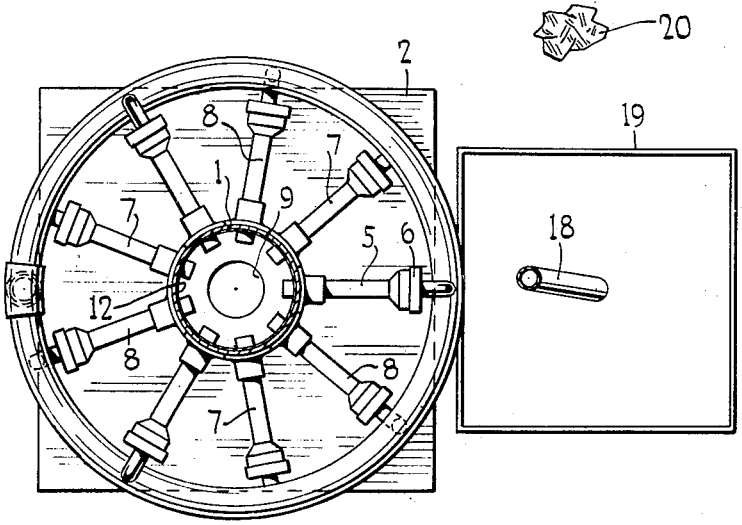
INVENTOR
RUDOLF H. POTTERS
BY
ATTORNEYS Patented Nov. 16, 1943

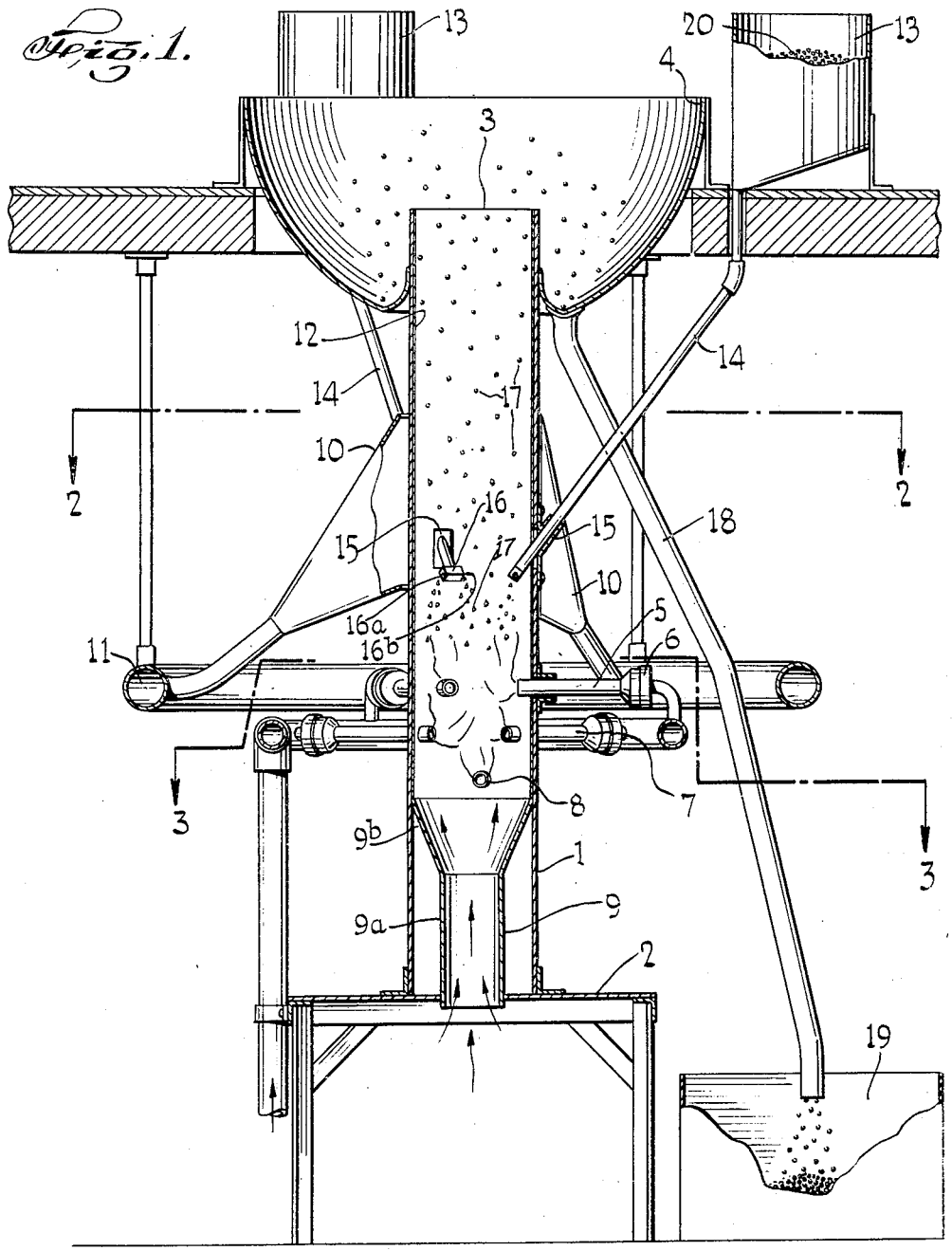

2,334,578

UNITED STATES PATENT OFFICE 2,334,578

METHOD OF AND APPARATUS FOR PRODUCING GLASS BEADS

Rudolf H. Potters, Jamaica, N. Y.

Application September 19, 1941, Serial No. 411,465

14 Claims. (Cl. 49—57)

This invention relates to the production of small glass beads of the order of .008" to .055" in diameter.

In certain fields, such as the production of reflecting motion picture screens, reflecting road signs and road markers and reflecting advertising signs, it is the practice to imbed glass beads of small diameter, within the size dimensions given above, in an adhesive matrix so that the beads backed by the adhesive matrix act as reflectors for light projected thereagainst. It is desirable that the beads be substantially spherical, as in most instances irregular and non-spherical beads or broken glass particles would cause defraction of the light rays to such an extent as to partially destroy the reflecting effect from the motion picture screen, road or advertising sign, or the like.

The production of small diameter glass beads of substantially uniform size and substantially true spheres, however, presents pronounced manufacturing difficulties. It has long been known that a molten material such as lead or glass when dropped from a height will take on a spherical shape. This fact has been made use of in the manufacture of lead shot and in the manufacture of large sizes of glass beads, such as in the making of marbles and other shapes in a diameter of more than ¼". When, however, attempts are made to drop molten glass in sufficiently small droplets to produce small diameter beads, the results are unsatisfactory because it is difficult to get a droplet of uniform size and small enough to produce such small diameter beads, and in many instances such extremely small droplets are blown out by air currents to such an extent that the particles adhere together and produce small clusters instead of beads.

Various attempts have been made to produce small diameter glass beads by grinding glass to the small particle sizes and by dropping or projecting these small particles through flames which will heat and soften the particles and cause them to take on a spherical shape. In general, the results of such operations are likewise unsatisfactory because the small particles of glass cannot be made to pass uniformly downwardly through a zone of flame in which there is sufficient draft to support combustion, and when dropped through the zone of flame so few of the particles remain in the heat zone a sufficient length of time to become softened and turned into spheres that the yield of truly spherical particles is only a very small percentage, often less than 10% of the number of ground glass particles dropped or projected into the flame.

After several years of experimentation, I have developed an apparatus and method of manufacture of small glass beads from ground glass particles, which, when applied to certain sizes of glass particles, will give a yield of truly spherical beads which are in excess of 90% of the number of ground glass particles treated in the apparatus.

In the manufacture of beads of the diameter of .008" to .055", it is my practice to grind glass of a suitable composition to fine particle size and then screen and classify the ground glass particles in accordance with the diameter of the glass beads to be produced. These ground glass particles are then dropped into a zone of heat and flame in a confined draft tube in which the draft is so regulated that while within the zone of heat and flame the particles reverse their direction of flow from a downward to an upward direction, and are then discharged from the top of the stack having been softened and shaped into a spherical shape during the period in which they were in the flame zone.

In the accompanying drawings which illustrate a preferred method and form of apparatus for practicing my invention:

Figure 1 is a sectional view of the heated draft tube and feeding arrangement used in the practice of the invention;

Figure 2 is a part sectional plan view through the draft tube along the line 2—2 of Figure 1, showing the location of the burners and cooling conduits;

Figure 3 is a sectional view on the line 3—3 of Figure 1, showing a tier of burners;

Figure 4 is an enlarged view indicating the shape of one of the ground glass particles before being subjected to heat; and Figure 5 is an enlarged view showing the spherical shape of the glass after it has been formed into a bead.

In the embodiment of the apparatus used in the practice of my invention, a draft tube or stack 1, which may be of any length and diameter but is preferably of a diameter of approximately 15" and of a length of approximately 12', is mounted in an upright position on a supporting table 2 with the top 3 of the stack open to the atmosphere and surrounded by a hopper 4 into which the formed glass beads may drop in an umbrella-like spray after they have been discharged from the top of the stack 1. The stack is heated by a plurality of gas jets 5 arranged in tiers 6, 7 and 8, and the number of gas jets in each tier and the number of tiers will be regulated to produce the amount of heat necessary to soften and shape the particles of glass undergoing treatment within the time they are in the heat zone. The flame of the gas burners is preferably regulated to mix the minimum amount of air with the combustion gases which is necessary to provide complete combustion with no carbon formation and yet prevent an excess of air. The draft in the stack 1 is regulated by a plurality of interchangeable draft regulators 9 which may be fitted into the lower part of the stack. Each draft regulator consists of the vertical cylindrical portion 9a of the diameter desired having a length sufficient to direct the air current upwardly through the center of the stack and an outwardly flared portion 9b which fits snugly against the wall of the stack and prevents the flow of air between the section 9a and the walls of the stack.

In the usual practice of my method in the apparatus shown, three or four draft regulators of different diameters are used, for example, in the use of a 15" diameter stack, I may have one regulator in which the section 9a is of a diameter of 5", another with a diameter of 7", and another with a diameter of 9", and depending upon the size of the glass particles being converted into beads the proper size of draft regulator will be inserted in the lower end of the stack 1. For example, if very small diameter glass particles are being converted into glass beads, the smallest size diameter draft regulator will be inserted so as to decrease the air flow through the stack and prevent the smaller glass particles from being carried out of the zone of heat by the draft prior to having been sufficiently softened to take the spherical shape. When larger glass particles are being converted into beads, a stronger draft is necessary to reverse the flow of particles and carry them out of the zone of heat, and a larger diameter draft regulator 9a will therefore be installed in the stack 1.

While a specific form of draft regulator has been shown, it will be understood that other forms may be used, and that anything which accomplishes the object of increasing or decreasing the flow of air through the draft tube may be used to regulate said draft.

In order to prevent the walls of the stack, particularly above the heat zone, from becoming too hot and having the particles of beads adhere thereto, and in order to prevent softening or melting of the stack walls due to heat, the outer walls of the stack may be artificially cooled, preferably by means of a series of air jets directed thereon from the spreading nozzles 10 which are connected with an air manifold 11 through which air at atmospheric temperature may be pumped, to direct a blast of air against the stack at selected points. In order to prevent adherence of the heated glass particles to the walls of the stack, the walls of the stack or draft tube are also coated with a refractory coating 12, which preferably extends from top to bottom of the draft tube and is of such a nature as to prevent adherence of the heated glass particles to the walls of the stack, and also of such a nature that if some of the heated glass particles or beads should adhere to the coating, a portion of the coating will drop off and permit its "icicle" of glass to drop out of the stack through the draft regulator 9. In this way, the building up of icicles which might cause clogging of the stack and stop operations is prevented. Any suitable refractory coating may be used, but I have found it preferable to use a magnesite coating applied with a liquid binder to form a suitable wash. During operations it is desirable to maintain the coating in good condition at all times, inasmuch as the coating sometimes spalls and breaks off, and parts of the coating are broken away by adhering icicles of glass. It is best, therefore, to stop operations, permit the stack to cool and recoat it by applying the coating in the form of a spray or wash which is dried in place by the heat in the stack about every three or four hours of operation.

The ground glass particles which have been sorted or classified to produce the size of bead desired and are of an uneven shape, as indicated at 20 in Figure 4, are stored around the sides of the draft tube 1 in a series of hoppers 13 located around the top of the tube, each of which is provided with a feed pipe 14 extending downwardly from the bottom of the hopper and projecting through the walls of the tube at points 15. I preferably use three hoppers and three feed lines so spaced that one feed line will enter the stack, each 120° around the stack. The ends of the feed line 14, which may be of ordinary pipe construction, terminate in a nozzle-like formation 16 having two outlets 16a and 16b, from each of which a stream of glass particles will flow from the hoppers 13 to the zone of flame created by the burners 5. In operation, no special feeding arrangements are necessary to cause the fine glass particles to feed from the hoppers 13 into the feed pipes 14 and from the nozzles 16 as they will flow like fine sand or sugar through these openings without mechanical agitation.

The streams of glass particles 17 flowing from the nozzles 16 are dropped downwardly into the zone of flame from a point slightly above the zone of flame and are subjected immediately to heat which begins to soften and shape the glass particles after dropping a few inches toward and into the zone of flame. The draft created by the burners and by the draft regulator 9 located in the bottom of the draft tube 1 soon overcomes the force of gravity by which the glass particles are dropped downward into the flame and causes the particles to reverse the direction of flow and carries the glass particles, shaped by the heat into spherical or bead-like form, as indicated at 21 in Figure 5, upwardly out of the top of the stack where they fall in a continuous umbrella-like pattern into the hoppers 4 which surround the top of the stack. Only those particles which have adhered together and built up in the form of icicles drop downwardly through the draft regulator 9 in the bottom of the stack, if the draft is regulated so as to carry upwardly out of the stack all of those individual particles within the size range of beads then being manufactured.

From the bottom of the bins 4 the formed beads flow through pipes 18 into receptacles 19 which when filled may be removed to classifying machines which will separate the truly spherical from the other beads. By the process and apparatus described, I have been able to secure a yield of perfect spherical beads in the order of 90% to 97% of the weight of the material charged into the apparatus, although without careful regulation and control of the draft and heat with reference to the size of particles and rate of flow, the percentage yield may vary greatly.

While I have described my preferred method and apparatus for forming glass beads from small glass particles, it will be understood that various modifications and changes can be made from the method and apparatus herein described without departing from the spirit of my invention or the scope of the appended claims.

I claim:

1. In a method of producing small diameter glass beads the steps which comprise dropping irregular shaped glass particles of substantially the size of the beads to be produced substantially vertically downward into a flame positioned within a stack and sufficiently hot to melt the surface of the glass particles, maintaining said glass particles in suspension in the gases of said flame until they assume a spherical shape and reversing the flow of the glass particles while within the flame and carrying the shaped beads upwardly and out of the zone of flame by a gaseous draft flowing upwardly through said stack.

2. The method of producing small diameter glass beads from ground glass particles which comprises directing a stream of ground glass particles downwardly into a zone of heat positioned within a stack and sufficiently hot to melt the surface of the particles, and reversing the flow of the stream of particles by a gaseous draft flowing upwardly through said stack so as to carry the particles upwardly and out of the zone of heat after they have been softened sufficiently to take on a spherical shape.

3. The method of producing glass beads from ground glass particles wherein a draft producing heating means is provided in a vertically positioned open ended tube which comprises flowing a stream of ground glass particles downwardly into said draft tube above said heating means, melting the surfaces of said particles to allow them to become spherical and reversing their flow to carry them out of the top of said tube.

4. The method of producing small diameter glass beads from glass particles ground to a size substantially equal to that of the beads to be produced wherein a vertically disposed tube containing a flame-producing means is provided, which comprises dropping said glass particles downwardly within said tube and into the flame of said flame-producing means, which flame is sufficiently hot to melt the surfaces of the glass particles, confining the particles within the zone of the flame until they have assumed a spherical shape, and reversing the flow of the particles and also carrying the shaped beads upwardly and out of the zone of the flame by means of a gaseous draft flowing upwardly through said tube.

5. The method of producing small diameter glass beads from ground glass particles wherein a vertically disposed tube containing a heating means is provided, which comprises dropping said ground glass particles downwardly into the heating zone of said heating means within said tube, heating the said glass particles within said zone to a temperature which melts the surfaces thereof and causes the particles to assume a spherical shape, and reversing the flow of the heated glass particles while within the zone of heating and also carrying the shaped beads upwardly and out of the zone of heating by a gaseous draft flowing upwardly through said tube.

6. The method of producing small diameter glass beads from ground glass particles ground and sorted to provide beads of substantially uniform size wherein a vertically positioned open ended tube and a heating means therein is provided, which comprises directing a stream of said glass particles downwardly into the said tube and into the heating zone of said heating means, and reversing the flow of the stream of particles by a gaseous draft flowing upwardly through said tube and also carrying the particles upwardly and out of the zone of heating after they have softened sufficiently to take on a spherical shape.

7. The method of producing glass beads from irregularly shaped glass particles ground to the approximate size of the beads to be produced wherein a vertically disposed open ended tube containing a flame-producing means is provided, which comprises introducing a stream of said glass particles downwardly into said tube and into the flame zone of said flame-producing means, and reversing the direction of flow of the glass particles by means of the draft in said tube to carry them out of the vertically disposed tube after they have been melted sufficiently to become spherical.

8. The method of producing glass beads having a diameter of from .008 to .055 inch from ground particles wherein a vertically disposed tube containing a flame-producing means is employed, which comprises flowing a stream of said ground glass particles of substantially uniform size within said diameter range downwardly into said tube and into the heating zone of said flame-producing means, causing a draft to flow upwardly through said tube at a velocity which allows the glass particles to enter the heating zone and become heated sufficiently to melt the surfaces thereof and allow them to become spherical, reversing the direction of flow of the particles by means of the draft in said tube and carrying the particles out of the flame zone where they solidify and thence out of the tube where they are collected.

9. In an apparatus of the type described a vertically disposed open-ended draft tube, a source of heat within the tube, means to control the flow of air through the tube, an inlet conduit adapted to direct a stream of glass particles downwardly into the tube above the source of heat and a container at the top of the tube to receive the glass particles which are discharged from the top of said tube.

10. In an apparatus of the type described a vertically disposed open ended draft tube, a source of heat within the tube, means to control the flow of air through the tube, an inlet conduit connected to said tube for introducing a stream of glass particles downwardly into the tube above the source of heat, a coating on the walls of the tube to prevent adherence of the glass particles to the walls of the draft tube, and a hopper at the top of the tube to receive the glass particles which are discharged from the top of said tube.

11. In an apparatus of the type described a vertically disposed open ended draft tube, a source of heat within the tube, means to control the flow of air through the tube, an inlet conduit connected to said tube for introducing a stream of glass particles downwardly into the tube above the source of heat, a coating on the inside walls of the tube to prevent adherence of the glass particles to the walls of the draft tube, means to cool the draft tube on the outside, and a hopper at the top of the tube to receive the glass particles which are discharged from the top of said tube.

12. In an apparatus of the type described a vertical draft tube open at both ends, a source of heat within the tube, a second open ended tube within said first-mentioned tube and of smaller diameter adapted to control the flow of air through the tube, inlet conduits to direct a stream of glass particles downwardly into the tube above the source of heat, conduits to direct streams of air against the tube on the outside, means to prevent adherence of the glass particles to the inside of the tube, and a receptacle at the top of the tube to receive the glass particles which are discharged from the top of said tube.

13. In an apparatus of the type described a vertical draft tube open at both ends, a source of heat within the tube, conduits to direct a stream of glass particles downwardly into the tube above the source of heat, a replaceable tube of less diameter than the said vertical draft tube positioned below the zone of heat, which tube is adapted to control the flow of air through the vertical draft tube so as to cause the glass particles to reverse their direction within the zone of heat and be carried upwardly out of the draft tube, and a receptacle at the top of the tube to receive the glass particles which are discharged from the top of said tube.

14. In an apparatus of the type described a vertical draft tube open at both ends, a source of heat within the tube, a renewable coating on the inside walls of the tube, a conduit for directing a stream of glass particles downwardly into the tube above the source of heat, means to control the flow of air through the tube so as to cause the glass particles to reverse their direction within the zone of heat and be carried upwardly out of the draft tube, and a hopper at the top of the tube to receive the glass particles which are discharged from the top of said tube.

RUDOLF H. POTTERS.